United States Patent Office 3,631,223
Patented Dec. 28, 1971

---

3,631,223
LACTAM POLYMERIZATION WITH POLYTHIOLACTONE INITIATORS
Markus Matzner, Edison, and James E. McGrath and Sui-Wu Chow, Somerville, N.J., assignors to Union Carbide Corporation, New York, N.Y.
No Drawing. Filed Apr. 27, 1970, Ser. No. 32,385
Int. Cl. C08g 20/00, 41/04
U.S. Cl. 260—857    8 Claims

ABSTRACT OF THE DISCLOSURE

Polythiolactones are utilized as polymerization initiators or activators with alkaline catalysts in the anionic polymerization of lactam monomers so as to provide for a rapid polymerization process. The polymers thus obtained have good physical properties and good color.

BACKGROUND OF THE INVENTION

Field of the invention

The invention relates to the anionic polymerization of lactam monomers.

Description of the prior art

In the anionic polymerization of lactams there is usually employed a catalyst-initiator system. The catalyst is commonly a material which will form an alkali or alkaline earth metal salt of the lactam. The initiators or activators that have been used to date have included a number of materials such as various lactones as disclosed, for example, in British Pat. 1,098,093.

These prior art catalyst-initiator systems, however, provide for a relatively slow rate of polymerization. These systems, because of their relatively slow rates of polymerization, are not too readily adaptable for use in various types of molding equipment that might be employed on a high speed production line wherein the polymerization reaction is conducted in situ, which technique is commonly employed today in the commercial molding of anionically produced lactam polymers.

SUMMARY OF THE INVENTION

Lactams are anionically polymerized utilizing a catalyst-initiator system whereby the lactams can be polymerized in a relatively short period of time. This system contains an anionic catalyst and, as the initiator or activator, one or more polythiolactone compounds.

An object of the present invention is to provide an anionic polymerization process whereby lactams may be readily polymerized in a relatively fast period of time to provide high molecular weight polymers.

Another object of the present invention is to provide a novel initiator or activator system for use in the anionic polymerization of lacctam monomers.

DESCRIPTION OF THE PREFERRED EMBODIMENT

It has now been found that lactams may be polymerized anionically in a relatively fast period of time if there is employed as the catalyst-initiator system for such polymerization, an anionic catalyst and, as an initiator or activator, one or more polythiolactone compounds.

The lactams

The lactams which may be polymerized according to the present invention are all those which are capable of being polymerized anionically, and are preferably those lactam monomers which contain at least one ring group of the structure

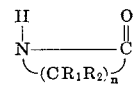

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bis-lactams such as alkylene bis lactams of the formula:

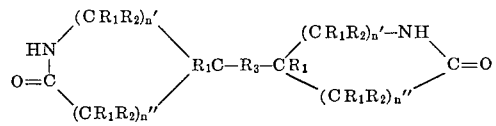

wherein $n'$ and $n''$ are each whole numbers such that $n'$ and $n''$ is 2 to 14; $R_1$ and $R_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulae:

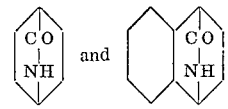

The lactams to be polymerized can be used individually or in any combination thereof.

The initiator

The polythiolactone initiators which can be used in the process of the present invention have the structure

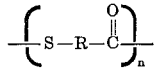

wherein R is a $C_2$ to $C_{20}$, inclusive, divalent carbon containing radical which can be substituted or unsubstituted, and $n$ is a whole number which is at least 5 and can be up to about 10,000. The carbon containing radical may be an aliphatic, alicyclic or aromatic hydrocarbon radical, or a heterocyclic radical, or a linear radical containing, in its chain, carbon as well as other elements such as oxygen and sulfur. In the preferred initiators $n$ has the value of from 10 to 500, inclusive, and R has the structure $(CR'R'')_m$, wherein $m$ is a whole number of about 3 to 8, inclusive, and R' and R'' may be the same or different and may be H or a $C_1$ to $C_{10}$ saturated or unsaturated aliphatic alicyclic or aromatic hydrocarbon radical, such as alkyl, alkaryl, aryl and alkylene radical, where it is alkylene, R' and R'' will join to form a ring. Examples of such initiators are polythio-ε-caprolactone, thio-ν-valerolactone, polythio-ν-caprolactone, polythio-laurolactone, polythio-δ-caprolactone and the like. The polythiolactone initiators may be used individually, or in combination with one or more other polythiolactone, or other initiators. About 0.1 to 10 mole percent of the initiator is employed, based on the moles of lactam monomer being polymerized.

The initiators of the present invention may be formed by a variety of processes from a corresponding monomeric thiolactone precursor. They can be prepared, for example, by the process of polymerizing the monomer hydrolytically, as in the presence of water or an alcohol as a cactalyst, or ionically by using materials such as butyl lithium as catalysts, in accordance with the equation

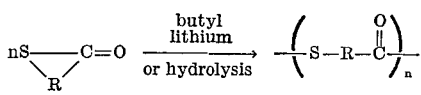

where R and $n$ are as defined above. The terminals of the polymer will vary depending on the structure of the particular catalyst used in the polymerization reaction in which the polythiolactone is formed, as well as on the termination step.

The polymers

The use of the initiators of the present invention results in the preparation of polymers by the following two step process:

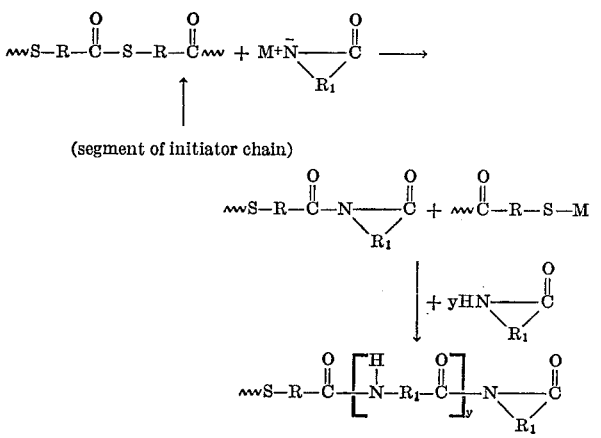

wherein R is as defined above,

M is the cation of the anionic catalyst,

is a polymeric segment of the initiator, $R_1$ is that portion of the structure of the lactam being polymerized which lies between the nitrogen atom and the carbonyl carbon atom of such lactam, and $y$ is a whole number which is >1 and is such that the polymer is a material that is normally solid, i.e., solid at temperatures of about 25° C., and has a reduced viscosity in m-cresol (0.1 gram/100 ml.) at 25° C. of ≥0.4, and preferably about 0.8 to 7, deciliters/gram.

The value of $y$ may vary somewhat in each polymerized lactam chain, and will be about 10 to about 5000. The polymers would thus have molecular weights of about 1000 to 500,000 or more.

The lactam polymers prepared with the polythiolactone initiators of the present invention have good color and physical properties. The cast polymers have particularly good high heat distortion temperatures, of the order of ≥100° C. (264 p.s.i.).

The catalyst

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 6 mole percent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

The polymerization process

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100 to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 100°–250° C., depending on the lactam(s) employed, and the polymerization temperature. The bulk polymerization reaction should be carried out under anhydrous conditions, i.e., in the presence of no more than about 0.3 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130 to 240° C. in dispersion systems such as those disclosed in U.S. 3,061,592 and 3,383,352 and by G. B. Gechele and G. F. Martins in J. Applied Polymer Science 9, 2939 (1965).

Adjuvants

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must by physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for the intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following example is merely illustrative of the present invention and are not intended as a limitation upon the scope thereof.

EXAMPLE

Dry ε-caprolactam containing <0.02% water was added (28.3 gr.~0.25 mole) to each of two 25 x 200 mm. test tubes suspended in a 140° C. oil bath. To one tube was added poly(ε-thiocaprolactone) (0.65 gm., reduced viscosity of 0.55 dl./gm., prepared from its monomer with n-butyllithium). After about ten minutes, with occasional shaking, the poly(ε-thiocaprolactone) dissolved in the ε-caprolactam, yielding a homogeneous solution. Sodium hydride (0.48 gm., 2 x $10^{-2}$ mole, 0.84 gm. of a mineral oil dispersion) was added to the second test tube. After five minutes, a homogeneous solution of sodium ε-caprolactam catalyst in ε-caprolactam was formed. Then the two test tubes were quickly and thoroughly mixed. Polymerization began within thirty seconds and after one minute, the poly(ε-caprolactam) was crystallizing. After five minutes, the solid, tough, yellow-white, cylindrical specimen was removed from the bath.

The polymer had a reduced viscosity value of 1.35 dl./gm. (0.1% at 25° C. in m-cresol) and was 94.6% water insoluble (24 hours in boiling water). Room temperature mechanical properties of a compression molded (prepared at 250° C.) specimen of the polymer were as follows:

Tensile modulus—218,00 p.s.i.
Tensile strength—7,300 p.s.i.
Elongation—170%
Pendulum impact—47

What is claimed is:

1. An improved process for anionically polymerizing lactam monomer with anionic lactam polymerization catalyst and anionic lactam polymerization initiator which comprises using as said initiator at least one polythiolactone compound having the structure

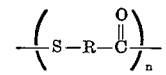

wherein R is a $C_2$ to $C_{20}$, inclusive, divalent carbon containing radical which can be substituted or unsubstituted, and $n$ is a whole number which is equal to or greater than 5 up to about 10,000, about 0.1 to 10 mole percent of said initiator being used based on the moles of lactam monomer being polymerized.

2. A process as in claim 1 in which said lactam comprises ε-caprolactam.

3. A process as in claim 1 in which said initiator comprises polythiocaprolactone.

4. A polymer having the structure

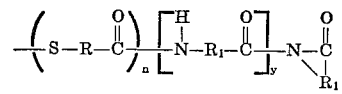

wherein
R is a $C_2$ to $C_{20}$, inclusive, divalent carbon containing radical which can be substituted or unsubstituted,
$n$ is a whole number which is equal to or greater than 5 up to about 10,000,
$R_1$ is that portion of a lactam monomer structure lying between the nitrogen atom and carbonyl carbon atom of said lactam, and $y$ is a whole number which is $>1$ and is such that the polymer is a material that is solid at about 25° C. and has a reduced viscosity in m-cresol, at 25° C. and at a concentration of 0.1 gram/100 ml., of equal to or more than 0.4 deciliter/gram.

5. A polymer as in claim 4 in which the lactam is ε-caprolactam.

6. A polymer as in claim 5 in which the polythiolactone is polythiocaprolactone.

7. As an article of commerce a shaped article formed from the polymer of claim 5.

8. An article of commerce as in claim 7 which is a cast article.

References Cited

UNITED STATES PATENTS

| | | | |
|---|---|---|---|
| 2,276,164 | 3/1942 | Cox et al. | 260—78 L |
| 2,832,757 | 4/1958 | Munch | 260—78 L |
| 3,239,490 | 3/1966 | Gee et al. | 260—78 L |
| 3,408,335 | 10/1968 | Van Mourik et al. | 260—78 L |
| 3,488,325 | 1/1970 | Pietrusza | 260—78 L |

PAUL LIEBERMAN, Primary Examiner

U.S. Cl. X.R.

260—78 L

UNITED STATES PATENT OFFICE
CERTIFICATE OF CORRECTION

Patent No. 3,631,223  Dated December 28, 1971

Inventor(s) M. Matzner, J. E. McGrath and S-W. Chow

It is certified that error appears in the above-identified patent and that said Letters Patent are hereby corrected as shown below:

Column 1, line 58 "lacctam" should read --lactam--.

Column 3, line 7 after "caprolactone," there should be inserted --polythio-$\gamma$-butyrolactone, polythio-$\delta$-valerolactone, poly- --.

Signed and sealed this 30th day of May 1972.

(SEAL)
Attest:

EDWARD M. FLETCHER, JR.
Attesting Officer

ROBERT GOTTSCHALK
Commissioner of Patents